July 5, 1927.

T. C. LENNOX 1,635,001

SYNCHRONOUS RECTIFIER

Filed Aug. 20, 1925

4 Sheets-Sheet 1

Inventor:
Thomas C. Lennox,
by *His Attorney.*

July 5, 1927.  T. C. LENNOX  1,635,001
SYNCHRONOUS RECTIFIER
Filed Aug. 20, 1925  4 Sheets-Sheet 2

Inventor:
Thomas C. Lennox,
by His Attorney

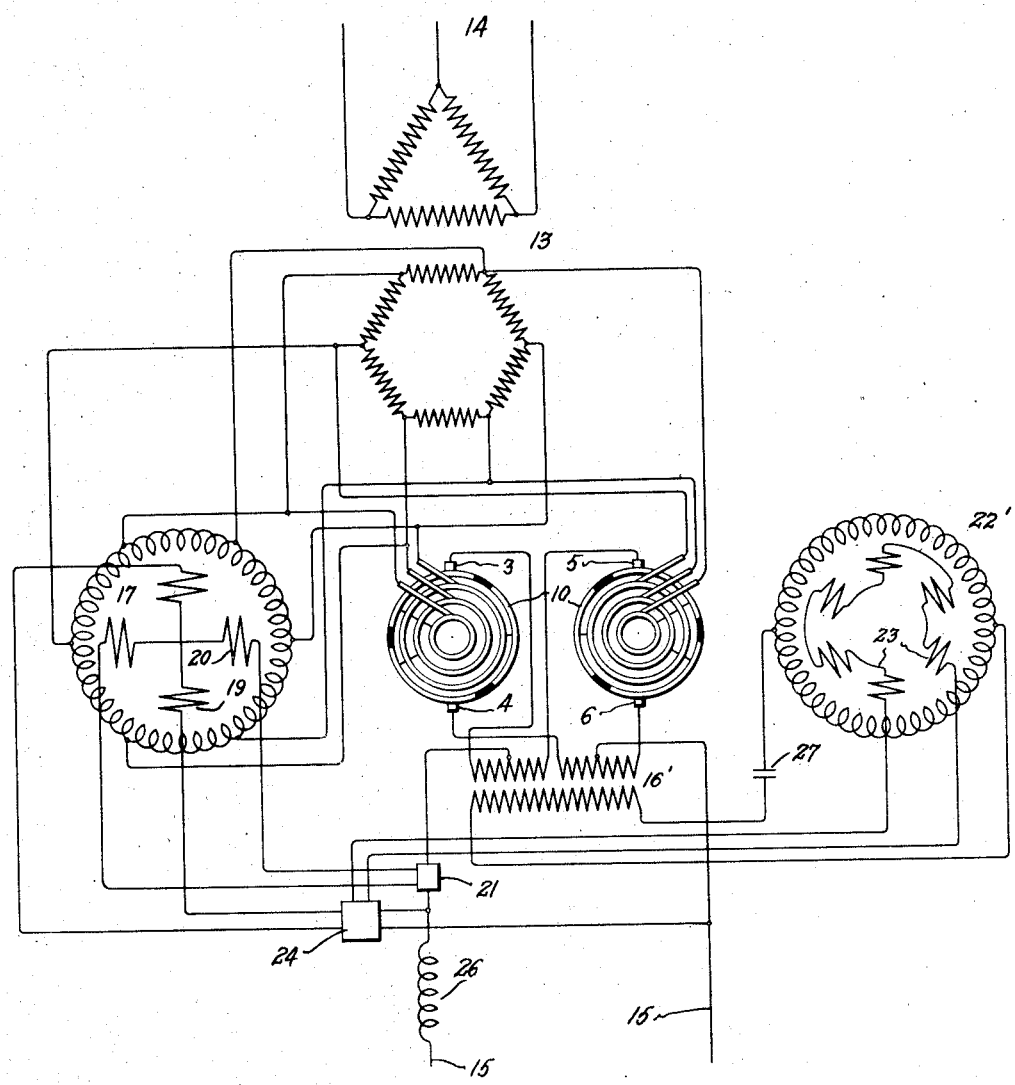

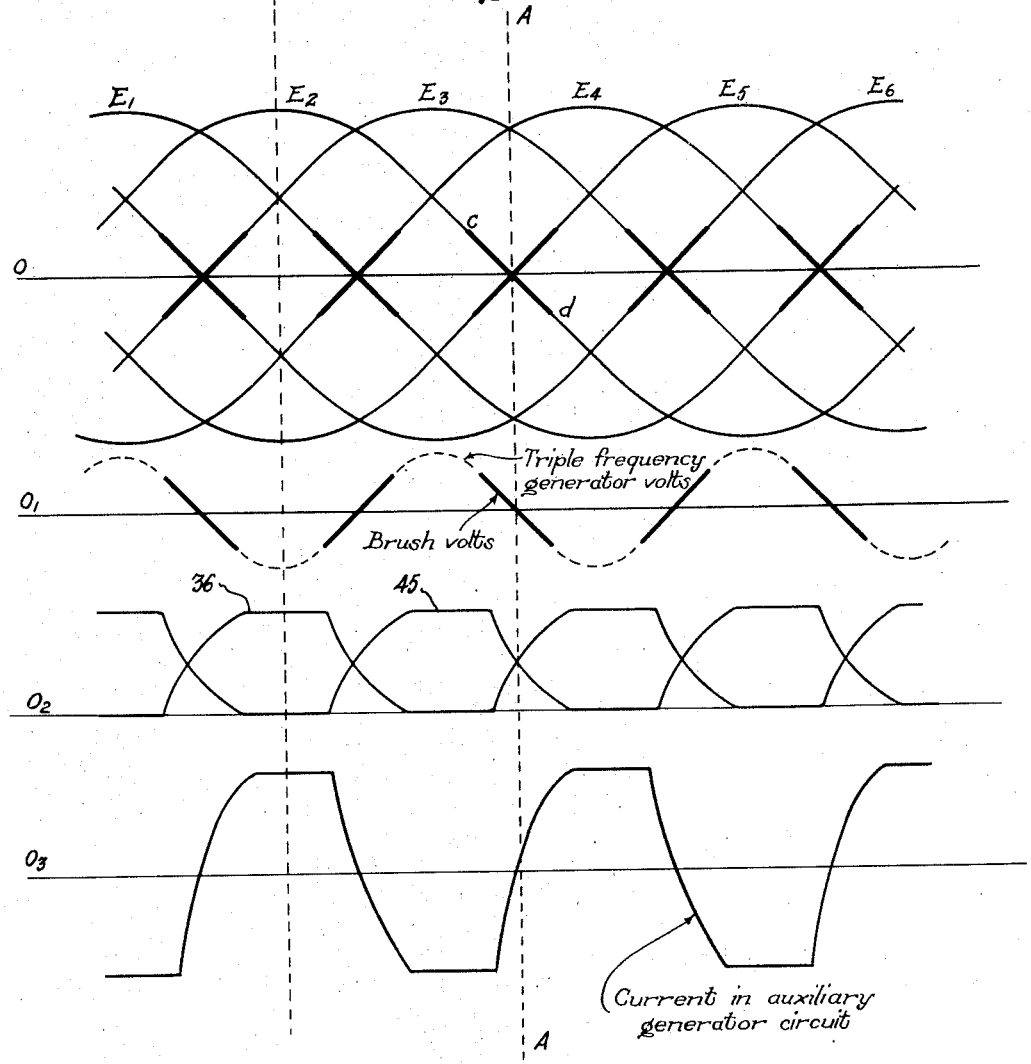

Patented July 5, 1927.

1,635,001

UNITED STATES PATENT OFFICE.

THOMAS C. LENNOX, OF PITTSFIELD, MASSACHUSETTS, ASSIGNOR TO GENERAL ELECTRIC COMPANY, A CORPORATION OF NEW YORK.

SYNCHRONOUS RECTIFIER.

Application filed August 20, 1925. Serial No. 51,492.

My invention relates to apparatus for changing alternating current to direct current, or vice versa, and in particular to a synchronous mechanical rectifying arrangement by means of which exceptionally high voltage may be handled without sparking.

In carrying my invention into effect I make use of polyphase synchronous rectifying contact-making devices of the open circuit type, or rectifiers which are arranged to completely open the circuit in one direction before closing it in the opposite direction. I combine with such an arrangement means for opposing the voltage between rectifiers of the several phases to prevent the flow of short circuit currents while permitting the flow of load currents.

Figure 1:
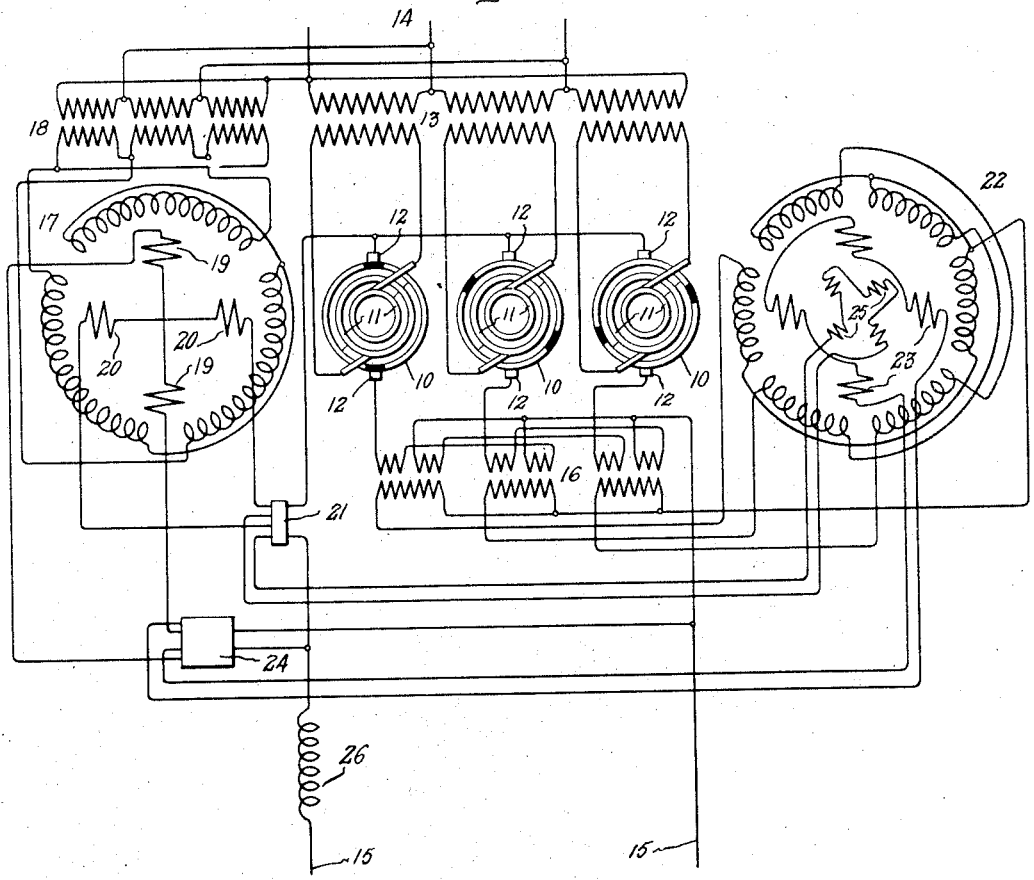
Figure 2:
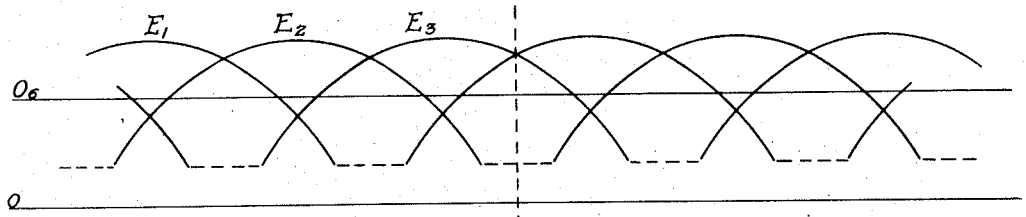
Figure 3:
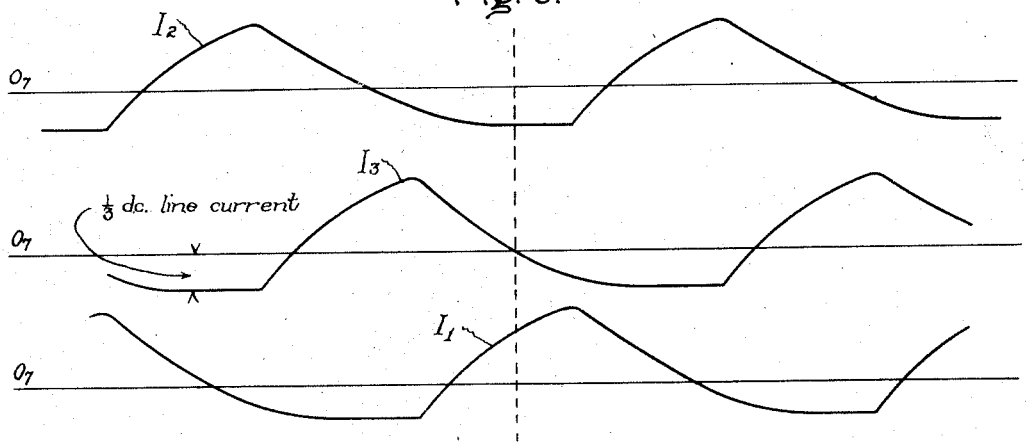
Figure 4:
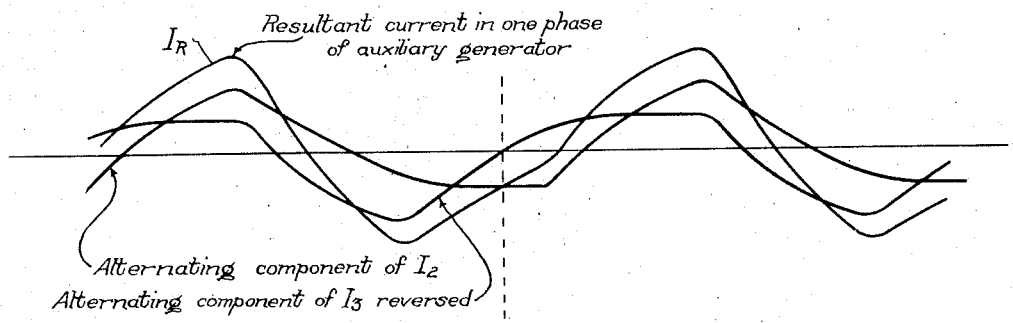

The features of my invention which are believed to be novel and patentable will be pointed out in the claims appended hereto. For a better understanding of the invention, reference is made in the following description to the accompanying drawing in which Fig. 1 illustrates rectifying apparatus for rectifying a three-phase circuit arranged in accordance with my invention; Figs. 2, 3 and 4 represent voltage and current curves to be referred to in the explanation of the apparatus of Fig. 1; Fig. 5 is a modification of my invention wherein series condenser apparatus is used in place of the series field of the auxiliary generator of Fig. 1; and Fig. 6 represents voltage and current curves explanatory of the apparatus of Fig. 5.

Fig. 1 of the drawing shows one form of the apparatus. The rectifiers shown are simple contact-making devices comprising in this case three sets of two-segment commutators 10 supplied by slip rings 11, and a pair of brushes 12 co-operating with each commutator arranged for opening and closing circuits in such sequence as to rectify six-phase alternating current. It is essential to my invention that these devices completely open the circuit in one direction before closing it in the other, and they will be hereinafter referred to as rectifiers of the open circuit type. The three mechanical rectifying devices are fed from a main transformer 13 the primary of which is supplied from a three-phase source 14. The three upper brushes of the rectifiers are of like polarity and are connected together to supply one side of a direct current line 15. The lower three brushes of the opposite polarity are connected through the three phases of an auxiliary transformer 16 to the other side of line 15.

The normal frequency alternator shown at 17 is intended to drive the rectifiers in exact time phase relation to the alternating voltage at their terminals and for this purpose is supplied from the source 14, if necessary, through a transformer 18. It will be observed that this alternator has two sets of field coils hereinafter referred to as the shunt field 19 and the series field 20. The shunt field serves to supply the usual excitation for such a motor. The series field which is placed in quadrature to the shunt field is intended to shift the phase position of the motor rotor in such a manner as to compensate for the difference in position with regard to the voltage at the rectifier terminals that will result when a load is placed on the apparatus. The regulating device represented at 21 for accomplishing this may be a simple arrangement for passing the load current of the direct current lines 15 through the field with an adjustable inductive resistance shunting it, or may be one of the more elaborate devices commonly used to control the field current of a generator in a predetermined manner actuated by the currents and voltages of the various circuits involved, or a combination of the two.

A double frequency alternator 22 mounted on the same shaft with motor 17 is used to prevent short circuit between rectifiers. As stated above, three of the six rectifier brushes are connected together and to one of the direct current lines. There will exist a varying voltage between the other three brushes which will be alternating three-phase double frequency but not of true sinusoidal form.

In Fig. 2 curves $E_1$, $E_2$, and $E_3$ represent the rectified voltages of the three phases, 1, 2 and 3 of the main transformer taken above the zero line O. The rectifiers apply these voltages between the direct current line and the terminals of the zig-zag interphase transformer 16. The direct current line preferably contains a reactor 26. The result is a three-phase alternating voltage of compromise form on the interphase transformer and a substantially uniform direct current voltage between direct current lines. The voltages $E_1$, $E_2$ and $E_3$, taken about the line $O_6$, corresponding to the direct current line voltage, applied through the zig-zag transformer result in the compromise three-phase voltage referred to. The difference between the resultant voltage and $E_1$, $E_2$ and $E_3$ on axis $O_6$ will be a ripple of six times fundamental frequency which will appear across the direct current reactor 26 and line. The three-phase voltage in the interphase transformer 16 is opposed by the voltage generated in the double frequency generator 22. Any difference in wave form between the rectified voltage and that generated may result in currents of harmonic frequency flowing to some extent but will not prevent its successful operation.

In order that the voltage of generator 22 may be proportional to the direct current line voltage and thus accomplish the object mentioned above, its shunt field 23 is connected across the line 15 through a regulating device represented at 24. Since the shunt fields of both machines 17 and 22 will generally require excitation proportional to the voltage of line 15, it will be convenient to provide means for simultaneously and proportionately regulating such excitation and for this reason the regulator 24 may serve for both field windings.

When a load is placed on the apparatus the pulsating currents flowing in each brush will consist of an alternating double frequency current imposed on a direct current of one-third full line current value. In Fig. 3, $I_1$, $I_2$ and $I_3$ represent approximately the wave form of these pulsating currents which add up to make up the total direct current line current, and $O_7$ are lines corresponding to one-third load current. In each phase of the zig-zag transformer 16, two of these currents will be opposed with the result that the equal direct current components will cancel and the alternating current components will add vectorally into $I_R$ as shown in Fig. 4, which will be required to flow in the secondary of the interphase transformer 16 if excessive induction in its core is to be avoided. These alternating currents will be three-phase and will flow into the double frequency alternator. In order that they may have the proper phase angle and magnitude so as to be equal and opposite to the direct currents as the contacts open and thus give zero total current, it is necessary to generate additional voltage in the generator 22 to overcome the reactance of the circuits. This voltage will be generated by circulating direct current in the series field 25 of the double frequency generator. This current may consist of the direct line current with a simple regulating inductive resistance shunting the field, or may be supplied by a regulating device actuated by the currents or voltages in the circuits or by a combination of the two and since it should be proportional to the series excitation of motor field 20, a common regulating device represented at 21 may serve for both purposes.

The current flowing into the double frequency generator being substantially in phase with the voltage of the circuit, it represents a flow of power. This power will be transmitted through the shaft into or out of the normal frequency alternator and thence to or from the alternating current line. In other words, when rectifying alternating current to direct current, more power is taken by the rectifier than is delivered to the direct current line, the difference being returned through the two alternators, one acting as motor and the other as generator. When converting direct current to alternating current, more power is delivered by the rectifiers than is taken from the direct current line, the difference being obtained through the generators from the alternating current line itself. This alternating current energy is of such voltage, frequency and phase relation as to substantially balance the voltage of commutation and prevent sparking at all loads.

Different numbers of phases and rectifiers may be used with this same general scheme. If more than one phase is connected to a single rectifier, the frequency of the second generator must be increased to correspond to the frequency of the rectified voltage. When only two rectifiers are used, the multiple frequency generator will be single phase. A larger number of phases connected to each rectifier will result in a smaller auxiliary generator and a smaller transfer of power through the shaft.

Fig. 5 shows a six-phase arrangement with two rectifiers and a single phase auxiliary generator. The arrangement is in general similar to Fig. 1, except that a static condenser 27 is used in place of the series field in the auxiliary generator.

In Fig. 6, $E_1$, $E_2$, $E_3$, $E_4$, $E_5$ and $E_6$ represent the voltage of the six phases 1, 2, 3, 4, 5, and 6 of the main transformer about axis O. The dotted line A—A represents the rectifier position shown in Fig. 5. The heavy portion of the lines (as from $c$ to $d$) represent the voltage between brushes of like polarity during the time when both rectifiers are in contact on all brushes. If short circuit is to be avoided, the voltage must be opposed by an equal and opposite one. This is accomplished through the interphase transformer 16' and the three times frequency generator 22' as shown on axis $O_1$, where the heavy line represents brush voltage and the dotted line the generator voltage.

The currents taken by the rectifier will be pulsating as shown on axis $O_2$ where curve 36 represents the current in brushes 3 and 6 and curve 45 represents the current in brushes 4 and 5. The two pulsating currents add together to give the direct current in the direct current lines, but the unidirectional components cancel in the transformer windings so that only the alternating current shown on axis $O_3$ is required of the triple frequency generator.

It will be observed that during the time when both rectifiers are in contact on all brushes the current must rise in certain circuits and fall in the others, as shown (on axis $O_2$). As the rectifier volts are balanced against the triple frequency generator volts, no voltage exists to bring this about except the IR drop in the circuits. The IR drop would normally cause the current to approach a condition of equal division between circuits but the introduction of the condenser 27 makes the circuit oscillatory so that the currents pass beyond the condition of equal division in the beginning of an oscillation. By properly proportioning the constants of the circuit, as explained in my application Serial No. 51,493 filed concurrently herewith, the current may be made to have zero value in each rectifier phase as its contacts open. With the connection shown this will automatically cause the current in each transformer phase to completely reverse during the time its two terminals are connected to brushes of like polarity. The condenser 27 of Fig. 5 serves the same function as the series field 25 of Fig. 1. The apparatus is reversible to convert direct current into alternating current. The mechanical and electrical connections between the auxiliary generator and rectifiers will of course be such as to establish the proper phase relation.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. Apparatus for converting alternating current to direct current, or vice versa, comprising polyphase mechanical rectifiers of the open circuit type, together with an alternator for driving the rectifiers in phase with the alternating voltage to be rectified and an alternator having a frequency which is a multiple of the rectifying frequency connected for opposing the voltage between rectifiers while permitting the flow of load currents through the rectifiers, said alternators each having two sets of field windings in quadrature, one for supplying normal excitation and the other for overcoming the reactive voltage of the rectifier circuits due to load currents.

2. Apparatus for converting alternating current to direct current, or vice versa, comprising polyphase mechanical rectifying contactors each of which is arranged to be open circuited at the instant when the alternating voltage connected thereto reverses, means for driving said rectifiers in phase with such alternating voltage, an alternating current generator of double the frequency of rectification connected to oppose the voltage between rectifiers and preventing the flow of short circuit currents between rectifiers while permitting the flow of load currents through the rectifiers, said generator having two sets of field coils in quadrature, one for supplying normal excitation and the other for supplying an excitation which is proportional to the load current through said rectifying apparatus.

3. An alternating current line, a direct current line and apparatus for transferring power from one line to the other comprising polyphase mechanical rectifiers of the open circuit type connected between said lines, means for driving said rectifiers in phase with the alternating current line voltage, an alternating current generator having a frequency which is a multiple of that of said alternating current line connected to oppose the voltage between rectifiers and thus preventing the flow of short circuit currents while permitting the flow of load currents through the rectifiers, said generator having a field winding connected in shunt to said direct current line and a field winding in quadrature with said first mentioned field winding connected in series relation with said direct current line, the phase and voltage relation between said multiple frequency generator and rectifiers being such as to maintain the current through the rectifiers in phase with the alternating current line voltage and to bring the current through the rectifiers substantially to zero as the rectifiers open.

In witness whereof, I have hereunto set my hand this 11th day of August 1925.

THOMAS C. LENNOX.